United States Patent
Simonazzi

(10) Patent No.: US 10,183,649 B2
(45) Date of Patent: Jan. 22, 2019

(54) APPLIANCE WITH VOLUMETRIC DETECTOR, USABLE IN PARTICULAR IN ANTI-BREAK-IN SYSTEMS FOR VEHICLES

(71) Applicant: Meta System S.p.A., Reggio Emilia (IT)

(72) Inventor: Giuseppe Simonazzi, Reggio Emilia (IT)

(73) Assignee: Meta System S.p.A., Reggio Emilia (IT)

( * ) Notice: Subject to any disclaimer, the term of this patent is extended or adjusted under 35 U.S.C. 154(b) by 351 days.

(21) Appl. No.: 14/898,793

(22) PCT Filed: Jun. 3, 2014

(86) PCT No.: PCT/IB2014/061923
§ 371 (c)(1),
(2) Date: Dec. 16, 2015

(87) PCT Pub. No.: WO2014/203102
PCT Pub. Date: Dec. 24, 2014

(65) Prior Publication Data
US 2016/0318479 A1    Nov. 3, 2016

(30) Foreign Application Priority Data

Jun. 18, 2013  (IT) .............................. MO2013A0173

(51) Int. Cl.
*G01S 15/04* (2006.01)
*B60R 25/10* (2013.01)
(Continued)

(52) U.S. Cl.
CPC .......... *B60R 25/1009* (2013.01); *G01S 7/521* (2013.01); *G01S 15/04* (2013.01); *G01S 15/88* (2013.01); *G08B 13/1618* (2013.01)

(58) Field of Classification Search
CPC ..... B60R 25/10; B60R 25/1009; G01S 15/04; G01S 7/521; G01S 15/88; G08B 13/1618
See application file for complete search history.

(56) References Cited

U.S. PATENT DOCUMENTS

| 4,636,997 A | 1/1987 | Toyama et al. |
| 2003/0035917 A1* | 2/2003 | Hyman ................... B41M 1/30 428/67 |

(Continued)

FOREIGN PATENT DOCUMENTS

| DE | 8713478 | 12/1987 |
| EP | 0144761 | 6/1985 |

(Continued)

OTHER PUBLICATIONS

Rapporto di Ricerca i Opinione Scritta [International Search Report and the Written Opinion] Dated Jul. 10, 2014 From the European Paten Office Re. Application No. PCT/IB32014/061923 and Its Translation Into English.

*Primary Examiner* — Isam A Alsomiri
*Assistant Examiner* — Amie M Ndure

(57) ABSTRACT

The appliance (1) with volumetric detector, usable in particular in anti-break-in systems for vehicles, comprises support means (2) associable with the structure of a vehicle, inside the compartment, an electronic control board (3) associated with the support means (2), at least a volumetric sensor (4) connected to the electronic control board (3) and suitable for detecting break-ins inside the compartment, and at least one volumetric sensor (4) associated integral with the electronic control board (3) and at least an acoustic duct (6) having a first mouth (7) associated with the volumetric sensor (4) and at least a second mouth (8) for emitting and/or receiving the sound waves generated by the volumetric sensor (4) and/or reflected by at least an obstacle inside the compartment.

14 Claims, 4 Drawing Sheets

(51) Int. Cl.
    *G01S 7/521*    (2006.01)
    *G01S 15/88*    (2006.01)
    *G08B 13/16*    (2006.01)

(56) References Cited

U.S. PATENT DOCUMENTS

| | | | | |
|---|---|---|---|---|
| 2005/0013477 | A1* | 1/2005 | Ratti | G06F 3/0425 |
| | | | | 382/154 |
| 2006/0249664 | A1* | 11/2006 | Beinhocker | G01J 1/04 |
| | | | | 250/227.15 |
| 2006/0261259 | A1* | 11/2006 | Beinhocker | G01J 1/04 |
| | | | | 250/227.15 |
| 2009/0005961 | A1* | 1/2009 | Grabowski | G01C 21/365 |
| | | | | 701/532 |
| 2010/0097580 | A1* | 4/2010 | Yamamoto | G02B 26/101 |
| | | | | 353/69 |
| 2012/0033429 | A1* | 2/2012 | Van De Ven | H05B 33/0803 |
| | | | | 362/294 |
| 2012/0090005 | A1* | 4/2012 | Marlow | G06Q 30/0241 |
| | | | | 725/42 |

FOREIGN PATENT DOCUMENTS

| | | | | |
|---|---|---|---|---|
| EP | | 1995114 | 11/2008 | |
| EP | | 1995114 A1 * | 11/2008 | B60Q 3/64 |
| WO | WO 2014/203102 | | 12/2014 | |

\* cited by examiner

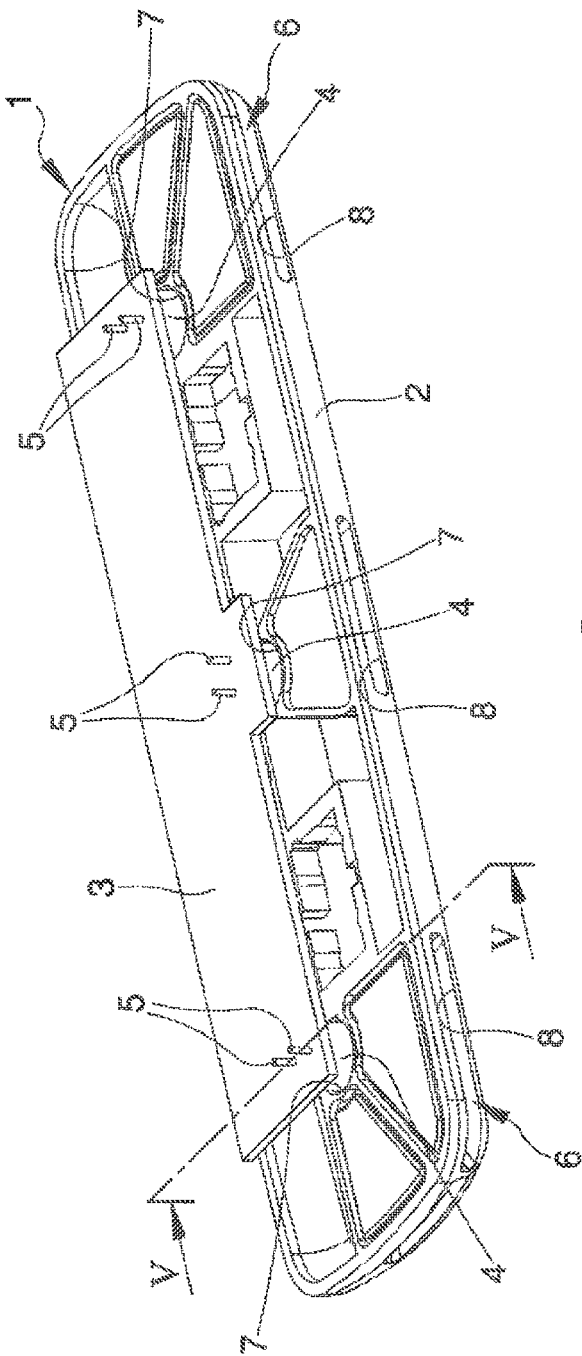
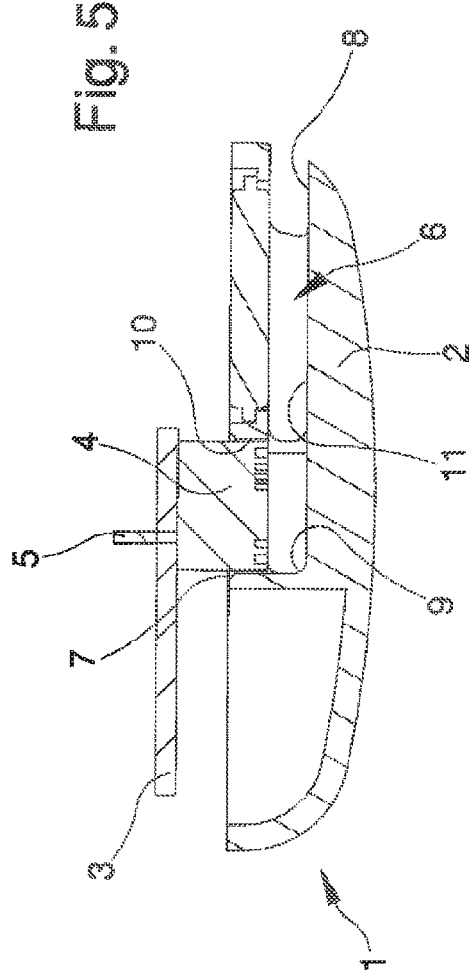

APPLIANCE WITH VOLUMETRIC DETECTOR, USABLE IN PARTICULAR IN ANTI-BREAK-IN SYSTEMS FOR VEHICLES

RELATED APPLICATIONS

This application is a National Phase of PCT Patent Application No. PCT/IB2014/061923 having International filing date of Jun. 3, 2014, which claims the benefit of priority of Italian Patent Application No. MO2013A000173 filed on Jun. 18, 2013. The contents of the above applications are all incorporated by reference as if fully set forth herein in their entirety.

TECHNICAL FIELD

The present invention relates to an appliance with volumetric detector, usable in particular in anti-break-in systems for vehicles.

BACKGROUND ART

The use is known of volumetric anti-break-in systems for cars and vehicles in general.

The volumetric anti-break-in systems of known type comprise a plurality of ultrasonic sensors suitably arranged and oriented in the compartment of the vehicle, so as to detect any movements such as, e.g., the opening of a door, the breaking of a window or unwanted access of a person.

The sensors are connected to an electronic control unit, generally made using a special electronic board, suitable for managing the sending and receiving of ultrasonic signals and the signaling of any break-ins.

Commonly, the volumetric anti-break-in systems of known type envisage the use of a special module, typically made up of a special ceiling light, installable inside the compartment at the roof or in other areas of the compartment, which has control electronics and ultrasonic sensors properly oriented.

By way of example only, FIG. 1 illustrates a ceiling light with sensors of known type, generally designated by reference A.

The ceiling light A comprises an enclosure B having housings C intended to accommodate the volumetric sensors D.

Typically, the volumetric sensors D are constituted by ultrasonic sensors with an ultrasonic signals transmission/receiving surface.

In particular, the housings C are made directly on the enclosure B, and are shaped so as to allow the positioning of the volumetric sensors D with the desired orientation, so as to distribute the emission of the ultrasonic signals to different areas of the compartment, without altering the relevant radiation diagram and without changing the spherical shape thereof.

The volumetric sensors D are connected to the control electronics, housed within the enclosure B itself, by means of respective electrical cables.

The ceiling lights of the known type, however, have some drawbacks.

In particular, the need to make special housings on the outer enclosure, suitable for allowing the correct orientation of the volumetric sensors emission/receiving surface in the desired direction, necessarily involves a minimum not negligible thickness of the enclosure itself, because the sensors used have a big and not modifiable shape and dimensions.

This implies therefore that, once installed, the ceiling light has considerable dimensions.

These dimensions also compromise the aesthetic look of ceiling light inside the compartment.

In addition, the installation of the ceiling light necessarily involves connecting the volumetric sensors to the control electronics using special electric cables before securing the enclosure containing the module in the predefined location or to the roof of the vehicle.

This inevitably complicates the installation procedure of the module or the ceiling light, prolonging the assembly and installation times.

SUMMARY OF THE INVENTION

The main aim of the present invention is to devise an appliance with volumetric detector, usable in particular in anti-break-in systems for vehicles, that is of reduced dimensions compared to the ceiling lights of known type.

Another object of the present invention is to devise an appliance with volumetric detector, usable in particular in anti-break-in systems for vehicles, which can be installed on board of a vehicle in a more simple and faster way than the ceiling lights of known type.

Another object of the present invention is to devise an appliance with volumetric detector, usable in particular in anti-break-in systems for vehicles, that once installed is less visible than the ceiling light of known type.

Another object of the present invention is to devise an appliance with volumetric detector, usable in particular in anti-break-in systems for vehicles, which allows a better and more effective diffusion of ultrasounds according to the inside the compartment of the vehicle.

Another object of the present invention is to provide an appliance with volumetric detector, usable in particular in anti-break-in systems for vehicles, which can overcome the above mentioned drawbacks of the prior art in the ambit of a simple, rational, easy and effective use and low cost solution.

The above mentioned objects are achieved by the present appliance with volumetric detector according to claim 1.

BRIEF DESCRIPTION OF THE DRAWINGS

Other characteristics and advantages of the present invention will become evident from the description of a preferred, but not exclusive embodiment of an appliance with volumetric detector, usable in particular in anti-break-in systems for vehicles, illustrated by way of an indicative, but not limitative, in accompanying drawings in which:

FIG. 4 is an axonometric view of the appliance according to the invention;

FIG. 5 is a sectional side view of the appliance according to the invention, along the plane V-V of FIG. 4.

DESCRIPTION OF THE SPECIFIC EMBODIMENTS OF THE INVENTION

Figure 1:
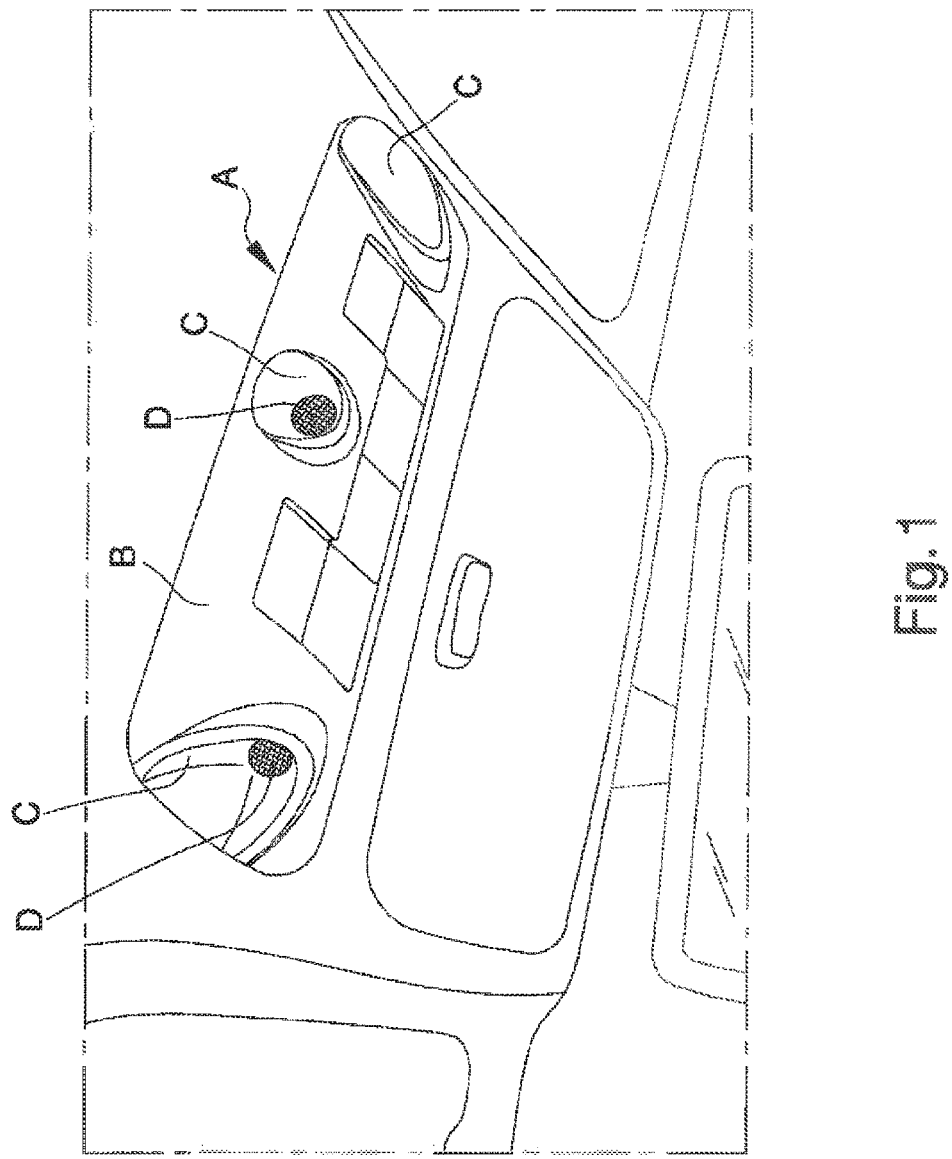
FIG. 1 illustrates a ceiling light with sensors of known type.
Figure 2:
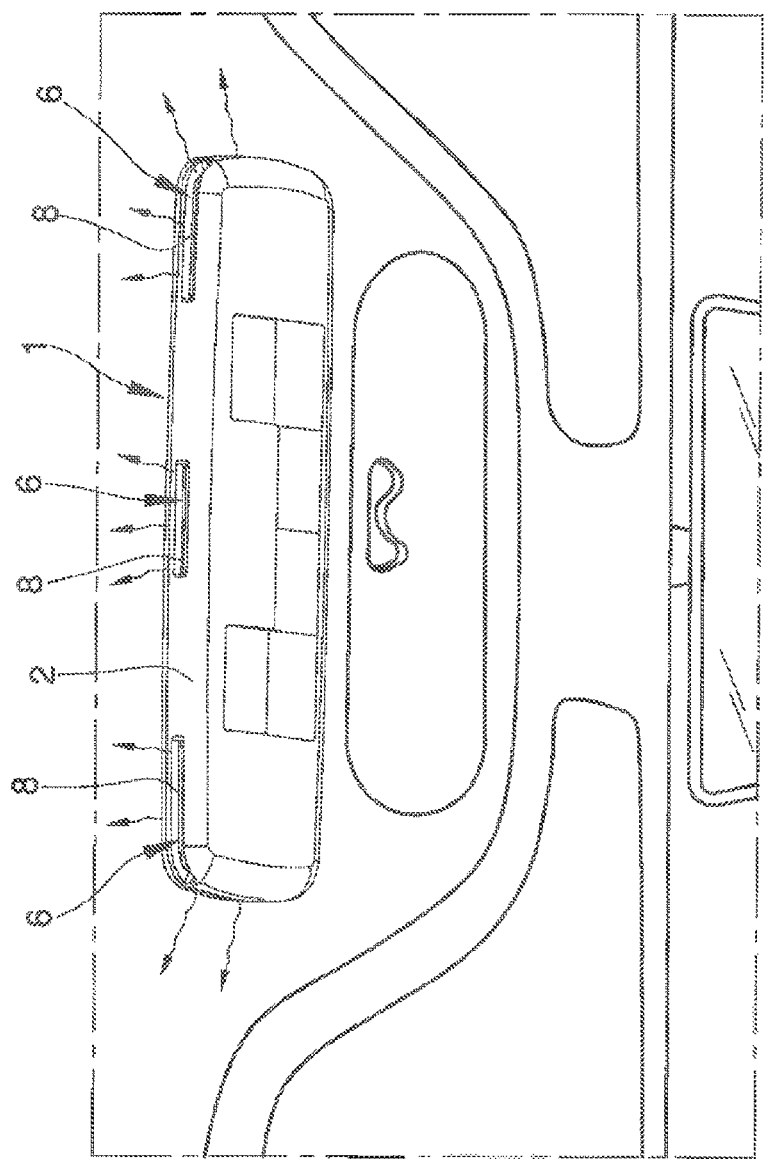
FIG. 2 is an axonometric view of the appliance according to the invention installed inside the compartment of a vehicle.
Figure 3:
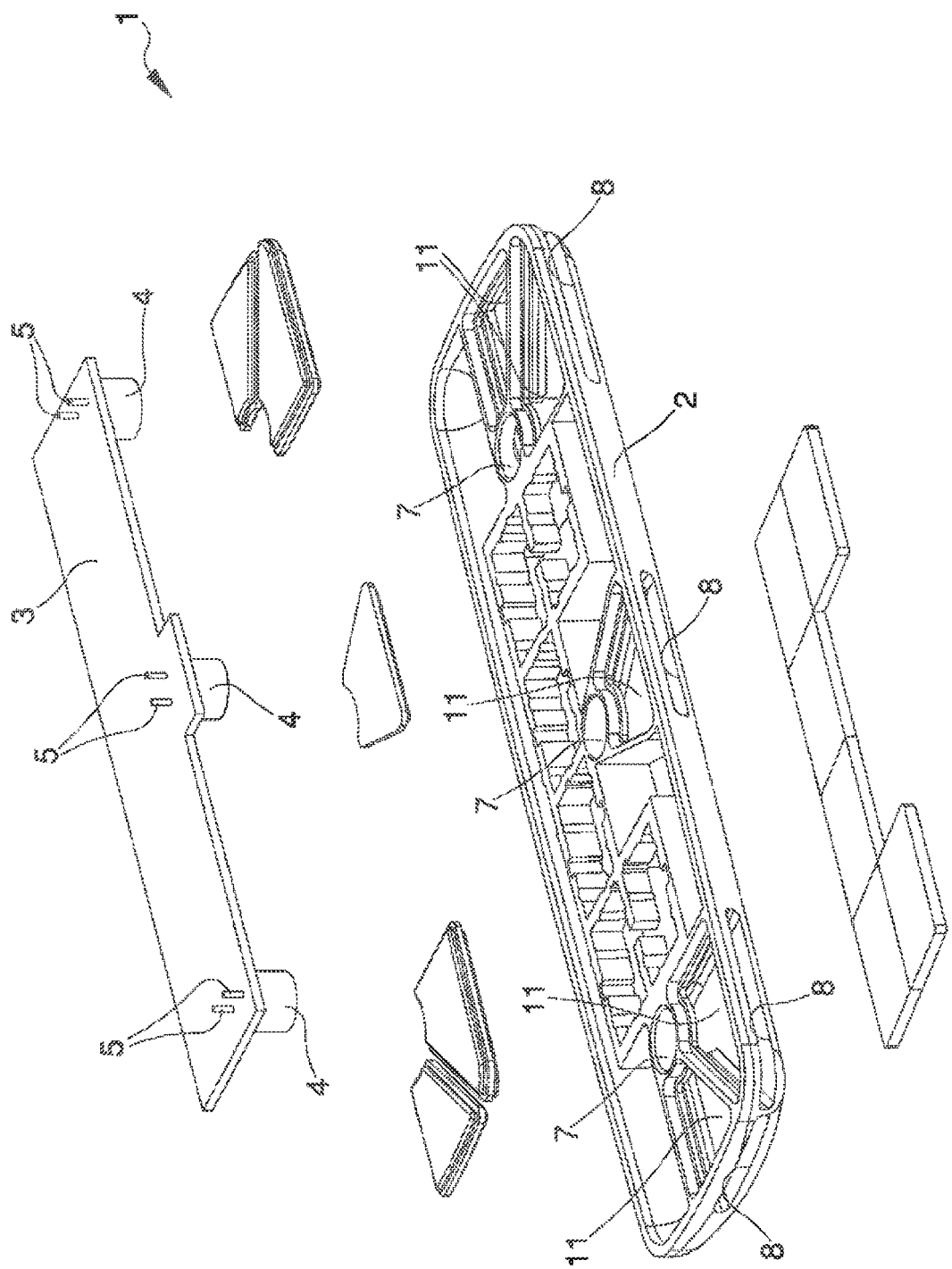
FIG. 3 is an axonometric and exploded view of the appliance according to the invention.

With particular reference to the figures, by reference numeral 1 is globally indicated an appliance with volumetric detector which can be installed inside the compartment of a vehicle and usable in anti-break-in systems.

In particular, with reference to the embodiment shown in the figures, the appliance 1 is constituted by a ceiling light which is installed in the roof, inside the compartment of the vehicle.

However, different embodiments cannot be ruled out, e.g. wherein the appliance 1 is not made up of a ceiling light but of a special module installable at different areas inside the compartment of the vehicle.

The appliance 1 comprises support means 2 associable with the structure of a vehicle, inside the compartment.

In particular, the support means 2 may be composed of an enclosure, made e.g. of polymeric material, having a portion which can be fixed to the roof of a vehicle and a portion intended to be facing towards the inside of the compartment.

The appliance 1 comprises an electronic control board 3, supported by the enclosure 2, and a plurality of volumetric sensors 4 connected to the electronic control board 3 and suitable for detecting break-ins inside the compartment.

In particular, with reference to the embodiment shown in the figures, the appliance 1 comprises three distinct volumetric sensors 4 arranged mutually spaced and designed to detect break-ins within the entire volume delimited by the compartment of the vehicle.

A different number and/or a different arrangement of volumetric sensors cannot however be ruled out.

Preferably, the volumetric sensors 4 are constituted by ultrasonic sensors.

Advantageously, the ultrasonic sensors 4 are associated integral with the electronic control board 3.

In particular, the electrical terminals 5 of the volumetric sensors 4 are directly connected to the electronic control board 3.

Furthermore, with reference to the preferred embodiment shown in the figures, the volumetric sensors 4 extend from one of the faces of the electronic control board 3, along a direction substantially at right angles to the lying plane of the electronic control board itself.

Advantageously, the appliance 1 comprises a plurality of acoustic ducts 6 connected to respective volumetric sensors 4 and able to suitably direct the ultrasonic signals emitted by the sensors within predetermined areas of the compartment.

In this way, according to the conformation and the extension direction of the acoustic ducts 6 it is possible to suitably direct the ultrasonic signals emitted by the volumetric sensors 4, so as to improve coverage inside the compartment of the vehicle.

In particular, it is possible to extend coverage also to areas that are not currently covered by existing technologies, such as e.g. OBD (On-Board Diagnostics) socket located in the passenger compartment.

In particular, each acoustic duct 6 comprises a first mouth 7 associated with the respective volumetric sensor 4 and at least a second mouth 8 for emitting and/or receiving the sound waves generated by the volumetric sensor 4 and/or reflected by at least an obstacle within the compartment.

Therefore, the acoustic ducts 6, the first mouth 7 and the second mouth 8 for emission can be suitably dimensioned and provided with a conformation and a shaping suitable for modifying the shape and/or direction of the emission/receiving lobe of the volumetric sensors 4, so as to define a predefined coverage volume inside the compartment and so as to ensure a correct diffusion of sound waves inside the compartment itself.

With particular reference to the preferred embodiment of the appliance 1 shown in the figures, the first mouth 7 and the second mouth 8 are substantially at right angles the one to the other and each acoustic duct 6 comprises a curved section 9.

Preferably, the acoustic duct 6 is substantially elbow-shaped.

Each acoustic duct 6 comprises a first section 10, substantially rectilinear, which extends from the first mouth 7 to the curved section 9 and a second section 11, substantially rectilinear, which extends from the curved section 9 to the second mouth 8.

In particular, the first section 10 extends along a direction substantially parallel to the normal of the transmission/receiving surface of the respective volumetric sensor 4, while the second section 11 extends along a direction substantially at right angles to the normal of such transmission/receiving surface.

Usefully, the profile of the first mouth 7 of each acoustic duct 6 substantially reproduces the profile of the transmission/receiving surface of the respective volumetric sensor 4.

Each volumetric sensor 4, therefore, is inserted at least in part within the respective first mouth 7 of the acoustic duct 6.

Usefully, each of the second mouths 8 of the acoustic ducts 6 has a substantially enlarged profile along at least a substantially horizontal direction of extension (considering the arrangement of the appliance 1 when it is installed on the roof of a vehicle, as shown e.g. in FIG. 1).

The second section 11 of each acoustic duct 6 has a transversal section with a substantially enlarged profile along at least a horizontal direction of extension. This transversal section increases from the curved section 9 to the second mouth 8.

Usefully, each of the two lateral volumetric sensors 4 of the appliance 1 is connected to a pair of acoustic ducts 6 having respective second mouths 8, designed to spread the ultrasonic waves inside the compartment both frontally and laterally.

In particular, the two acoustic ducts 6 have just a first mouth 7, inside which is at least partially fitted the volumetric sensor 4, and respective second portions 11 ending up in corresponding second mouths 8 suitable for emitting/receiving sound waves along directions substantially different from one another.

It has in practice been found how that the described invention achieves the proposed objects.

In particular, the fact is underlined that the fixing of volumetric sensors directly to the electronic control board, together with the use of special acoustic ducts for the direction and dissemination of ultrasonic signals, allow for reduced appliance dimensions than the ceiling lights of known type.

In addition, the fixing of volumetric sensors directly to the electronic control board allows to simplify and speed up the installation procedure of the appliance with respect to the ceiling lights of known type.

Not the least advantage is given by the fact that the reduced dimensions of the appliance according to the invention involves a minor aesthetic impact than the ceiling lights of known type.

What is claimed is:

1. Appliance (1) with volumetric detector, usable in particular in anti-break-in systems for vehicles, comprising support means (2) associable with the structure of a vehicle, inside the compartment, at least one electronic control board (3) associated with said support means (2), at least a volumetric sensor (4) connected to said electronic control board (3) and suitable for detecting break-ins inside the compartment, wherein said at least one volumetric sensor (4) is associated integral with said electronic control board (3) and in that said appliance (1) comprises at least an acoustic duct (6) having a first mouth (7) associated with said volumetric sensor (4), at least a curved section (9) and at least a second mouth (8) for emitting and/or receiving the sound waves generated by said volumetric sensor (4) and/or reflected by at least an obstacle inside the compartment, said first mouth (7) and said second mouth (8) are substantially at right angle the one to the other, and wherein at least one between said acoustic duct (6), said first mouth (7) and said second mouth (8) has at least a shape and/or shaping suitable for modifying the shape and/or direction of the emission/receiving lobe of said volumetric sensor (4), so as to define a predefined coverage volume inside the compartment.

2. Appliance (1) according to claim 1, wherein said acoustic duct (6) comprises at least a first section (10) which extends from said first mouth (7) to said curved section (9).

3. Appliance (1) according to claim 2, wherein said first section (10) is substantially rectilinear.

4. Appliance (1) according to claim 2, wherein said acoustic duct (6) comprises at least a second section (11) which extends from said curved section (9) to said second mouth (8).

5. Appliance (1) according to claim 4, wherein said second section (11) is substantially rectilinear.

6. Appliance (1) according to claim 4, wherein said second section (11) extends along a direction substantially at right angles to the normal of a transmission/receiving surface of said volumetric sensor (4).

7. Appliance (1) according to claim 4, wherein said second section (11) has an increasing transversal section from said curved section (9) to said second mouth (8).

8. Appliance (1) according to claim 7, wherein the transversal section of said second section (11) has a substantially enlarged profile along at least one direction of extension.

9. Appliance (1) according to claim 2, wherein said first section (10) extends along a direction substantially parallel to the normal of a transmission/receiving surface of said volumetric sensor (4).

10. Appliance (1) according to claim 1, wherein the profile of said first mouth (7) substantially reproduces the profile of a transmission/receiving surface of said at least one volumetric sensor (4).

11. Appliance (1) according to claim 1, wherein said second mouth (8) has a substantially enlarged profile along at least one direction of extension.

12. Appliance (1) according to claim 1, comprising a plurality of acoustic ducts (6) having just one first mouth (7) associated with said volumetric sensor (4) and respective second emission and/or receiving mouths (8) suitable for emitting/receiving sound waves along directions which are substantially different the one to the other.

13. Appliance (1) according to claim 1, wherein said at least one volumetric sensor (4) extends from said electronic control board (3) along a direction substantially at right angles to the lying plane of the electronic control board (3) itself.

14. Appliance (1) according to claim 1, wherein said volumetric sensor (4) has at least an electrical terminal directly connected to said electronic control board (3).

* * * * *